United States Patent [19]

Grossman

[11] 3,905,824

[45] Sept. 16, 1975

[54] GLASS-CERAMIC ARTICLES WITH ORIENTED MICA CRYSTALS AND METHOD

[75] Inventor: David G. Grossman, Corning, N.Y.

[73] Assignee: Corning Glass Works, Corning, N.Y.

[22] Filed: Nov. 11, 1974

[21] Appl. No.: 522,495

[52] U.S. Cl. .................................. 106/39.6; 65/33
[51] Int. Cl.² ................................................. C03C 3/22
[58] Field of Search .............................. 106/39.6; 65/33

[56] References Cited
UNITED STATES PATENTS

| | | | |
|---|---|---|---|
| 3,149,947 | 9/1964 | Eppler et al. ........................... | 65/33 |
| 3,325,265 | 6/1967 | Stookey .................................. | 65/33 |
| 3,799,836 | 3/1974 | Rogers et al. ......................... | 65/33 X |

FOREIGN PATENTS OR APPLICATIONS

| | | | |
|---|---|---|---|
| 247,589 | 9/1962 | Austria ................................... | 106/39.6 |
| 848,447 | 9/1960 | United Kingdom .................... | 106/39.6 |

*Primary Examiner*—Helen M. McCarthy
*Attorney, Agent, or Firm*—Kees Van der Sterre; Clinton S. Janes, Jr.; Clarence R. Patty, Jr.

[57] ABSTRACT

Glass-ceramic articles consisting of fluor-mica or fluor-amphibole crystals dispersed in a glassy matrix, exhibiting modified physical properties due to the non-random orientation of these crystals therein, and methods for making them, are described.

4 Claims, 4 Drawing Figures

PATENTED SEP 16 1975 3,905,824

GLASS-CERAMIC ARTICLES WITH ORIENTED MICA CRYSTALS AND METHOD

BACKGROUND OF THE INVENTION

Glass-ceramic articles wherein fluorophlogopite mica solid solution crystals comprise the principal crystal phase are known. U.S. Pat. No. 3,689,293 to Beall describes the manufacture of such articles and the desirable electrical and mechanical properties exhibited thereby.

The micas comprise a family of silicate minerals that have a unique two-dimensional or sheet structure. Naturally-occurring mica consisting of large crystals which can readily be split into thicknesses of 0.001 inch or less. The property of flexibility, coupled with high dielectric strength, has made sheet mica a very important electrical insulating material.

Most naturally-occurring micas are hydroxyl silicates whereas most synthetic micas have been produced by replacing the hydroxyl groups within the structure with fluorine. Much research has been undertaken in the field of synthetic mica and this work can be categorized into five general areas: efforts to produce single crystals of fluorine mica, hot-pressed fluormica ceramics, glass-bonded fluormica ceramics, fusion cast mica materials, and, recently, fluormica glass-ceramics. This research has demonstrated that, whereas fine-grained, polycrystalline mica ceramics do not maintain the single crystal property of flexibility, these products can, nevertheless, possess excellent dielectric properties, thermal stability, and mechanical machineability.

The crystal structure of fluormica has been studied extensively with the generalized structural formula written as $X_{0.5-1}Y_{2-3}Z_4O_{10}F_2$, where X represents cations which are relatively large in size, i.e., 1.0-1.6 A. radius, Y represents somewhat smaller cations, i.e., 0.6-0.9 A. radius, and Z represents small cations, 0.3-0.5 A. radius, which coordinate to four oxygens. The X cations are in dodecahedral coordination and the Y cations in octahedral coordination. The basic unit of the mica structure is the $Z_2O_5$ hexagonal sheet formed because each $ZO_4$ tetrahedron shares three of its corners with others in a plane. In the fluormicas, as for all micas, two $Z_2O_5$ sheets, each with their apical oxygens and associated interstitial fluoride ions directed toward each other, are bonded by the Y cations. These cations coordinate octahedrally to two oxygens and one fluorine from each $Z_2O_5$ sheet. The resultant mica layer has been called a 2 to 1 layer because it consists of two tetrahedral sheets with one octahedral sheet. The fluoride ions and the associated apical oxygens of the tetrahedral sheet offset the anions of the octahedral sheet. The mica layers themselves are bonded to each other by the relatively large X cations in the so-called interlayer sites. These X cations are normally potassium but are sometimes such other large alkali metal and alkaline earth cations as $Na^+$, $Rb^+$, $Cs^+$, $Ca^{+2}$, $Sr^{+2}$, and $Ba^{+2}$.

U.S. Pat. No. 3,689,293 discloses that glass-ceramic articles consisting essentially of fluormica crystals dispersed in a minor amount of residual glass can be produced from glasses in the alkali—MgO—$B_2O_3$—$Al_2O_3$—$SiO_2$—F composition system. In the micas which crystallize from these glasses, the X, Y and Z positions are normally filled as follows: X position-K, Na, Rb, Cs; Y position-Mg,Al,Li; and Z position-Al, B, Si. The basic mica structure identified by X-ray diffraction analysis corresponds to a fluorophlogopite solid solution. The fluorophlogopite solid solution normally comprises three components: normal fluorophlogopite, $KMg_3AlSi_3O_{10}F_2$, boron fluorophlogopite, $KMg_3BSi_3O_{10}F_2$ and a subpotassic aluminous phlogopite whose exact composition is unknown but which may approach a formula close to $$K_{.8}Mg_{2.9}Al_{.9}B_{.1}Si_{3.1}O_{10}F_2$$

The fluorophlogopite mica solid solution crystals formed in glass-ceramics of this type consist of mica platelets made up of stacked mica layers which typically have a grain size (platelet diameter) in excess of about 5 microns and an aspect ratio (platelet diameter:platelet thickness) of at least about 5:1. These crystals normally comprise at least about 50% but not more than about 90% of the volume of the article. The crystals are randomly oriented through the volume of the crystallized material, there being no discernable preferred alignment of mica platelets in the glassy matrix in which they are disposed.

The fluorophogopite micas comprise only one variety of the several kinds of fluormicas which have been grown as crystal phases in glass-ceramic articles. U.S. Pat. No. 3,756,838 to Beall describes other fluormica glass-ceramics in the (Ba,Sr)O—MgO—$Al_2O_3$—$SiO_2$—F composition system which comprise alkali-free, alkaline earth metal fluormica crystals as the principal crystal phase. In these crystals, the X positions are occupied by Ba or Sr, the Y positions by Mg, and the Z positions by Al and Si in a cation ratio (Al:Si) of about 1:3.

U.S. Pat. No. 3,732,087 to Grossman describes still another fluormica glass-ceramic system wherein tetrasilicic fluormica crystals comprise the principal crystal phase. Glass-ceramic articles comprising these crystals are obtained by heat treatment of glasses in the $(K,Rb,Cs)_2O$—$(Sr,Ba,Cd)O$—MgO—$SiO_2$—F composition system. In tetrasilicic fluormica crystals the X positions are occupied by K,Rb,Cs,Ba,Sr or Cd as available, the Y positions are occupied by Mg exclusively, and the Z positions are occupied by Si exclusively.

Glass-ceramic articles comprising randomly-oriented elongated crystals related to the amphiboles are also known. Amphiboles are a family of silicate minerals which occur in nature as fibers or fibrous masses, and the formation of synthetic amphiboles, namely fluorine amphiboles, has also been a topic for extensive research. U.S. Pat. No. 3,839,056 to Grossman describes the preparation of glass-ceramic articles from glasses in the $(Li,Na)_2O$—$(Ca,Mg)O$—$(B,Al)_2O_3$—$SiO_2F$ composition field which comprise fluor-amphibole crystals as the principal crystal phase.

The general structural formula of the fluoramphiboles may be given as $W_{0-1}.X_5.Y_5.(Z_4O_{11})_2.F_2$, wherein the coordination of the cations to either oxygen or fluorine is: W = 12, X = 8, Y = 6, and Z = 4. W positions are occupied by ions of radius 0.7 to 1.3A, chiefly $Na^{+1}$, $K^{+1}$, $Ca^{+2}$, $Mg^{+2}$ and $Li^{+1}$. X positions are occupied by ions of radius 0.7 to 1.1A, including $Ca^{+2}$, $Na^{+1}$, $Fe^{+2}$, $Mg^{+2}$, $Li^{+1}$ and $Mn^{+2}$. Y positions are occupied by ions of radius 0.5 to 0.9A such as $Mg^{+2}$, $Fe^{+2}$, $Mn^{+2}$, $Fe^{+3}$, $Al^{+3}$, $Li^{+1}$ and $Ti^{+4}$. Z positions are occupied by small, high valence ions of four-fold coordination, principally $Si^{+4}$ but to a lesser extent (up to about 25%) $Al^{+3}$.

The backbone of the amphibole structure is formed by double silicate chains which are crosslinked alternately by oxygen and fluorine. Each double chain is made up of single chains arranged side by side in a herringbone pattern. The single chains are crosslinked alternately by the X cations in eight-fold coordination and the Y cations in six-fold (octahedral) coordination.

A desirable feature of these fluor-amphibole crystals is their fibrous or needle-like habit. The growth of such crystals in situ in the glass can produce a fiber-containing glass matrix wherein the fibers are undamaged and thus extremely strong.

A common feature of all of the above-described glass ceramic materials is the anisometric (non-symmetrical) nature of the crystals making up the principal crystal phase. In each case, the crystal making up the major proportion (at least about 50%) of the volume of the material exhibits at least one, and in the case of mica platelets, two crystal dimensions which are relatively large with respect to the remaining crystal dimensions.

It will be recognized that the alignment in a glass-ceramic material of crystals of high aspect ratio such as the micas and fluor-amphiboles could have the effect of enhancing certain physical properties along specific directions in the material. Thus crystal orientation could result in the modification of the strength, thermal expansion, electrical, and optical properties of a glass-ceramic article.

SUMMARY OF THE INVENTION

The present invention is broadly concerned with methods for the production of glass-ceramic articles comprising crystal phases exhibiting non-random orientation, i.e., preferential crystal alignment in a specified direction, in order to modify the properties of the resulting glass-ceramic articles. These methods are particularly useful in the treatment of glass-ceramic compositions which comprise anisometric crystals such as the micas and amphiboles, since orientation of such crystals can substantially modify the properties of the resulting material.

The orientation methods employed in accordance with the invention are of two basic types, the first involving processes for treating nucleated glass to obtain alignment of nuclei prior to crystallization, and the second being concerned with processes for aligning the crystals themselves during or after the period of crystal growth in the glass.

Both processes involve the deformation of glass to generate non-uniform strain therein which tends to align the largest crystal dimensions in common directions.

The first orientation method, which is of somewhat limited application, comprises the discovery that non-random orientation of fluorophlogopite mica crystals in glass-ceramic articles comprising these crystals can be achieved by the orientation of crystal nuclei. The resulting glass-ceramic articles contain strongly-oriented mica crystals and exhibit substantially modified physical and thermal properties consistent with the presence of aligned crystals therein.

Broadly this method involves the plastic deformation of heat-softened, nucleated glass, i.e., glass containing nuclei upon which the mica crystals are subsequently to be grown, in order to obtain alignment of these nuclei. Thereafter epitaxial growth of mica crystals on these aligned nuclei is induced by conventional crystallization heat treatment of the reformed glass article. In this way, a mica crystal phase exhibiting the degree of alignment impressed on the nuclei by the deformation of the glass is obtained.

The operability of this method depends upon the phenomenon of epitaxial fluorophlogopite mica growth on crystal nuclei in these systems, and also upon the fact that at least some of the nucleating phases which occur during the nucleation process are anisometric, e.g., of rod or platelet configuration. Thus these nuclei may be aligned by forces acting within the material during deformation of the nucleated glass, and this alignment will be retained by the final fluorophlogopite phase. Similar crystal phase alignment has not been observed in other compositions exhibiting other nucleating phases, treated in accordance with this method.

The crystal phase alignment which may be produced in these fluorophlogopite solid solution glass-ceramics is defined by reference to the orientation of the mica layers of the crystal grains, and is of two distinct types. In the first type, the crystals are oriented such that the mica layers thereof lie parallel to a common plane, so that the mica platelets are largely parallel to each other. In the second type, the crystals are oriented such that the mica layers thereof are parallel to a common axis.

The first type of crystal orientation is obtained by compressive deformation of softened nucleated glass, as by pressing or rolling, and is exemplified by a compressively-formed glass-ceramic sheet wherein the mica platelets are all aligned in directions parallel with the sheet surface. The second type of orientation is obtained by elongation of softened, nucleated glass, as by drawing or stretching, and is exemplified by a redrawn glass-ceramic fiber wherein the mica platelets lie parallel to the fiber axis, (an axis of symmetry for the material) and no platelets are perpendicular to the fiber axis. This latter type of orientation is common in redrawn materials and is called a fiber texture.

These crystal orientations are further illustrated in the DRAWING, wherein

Figure 1:
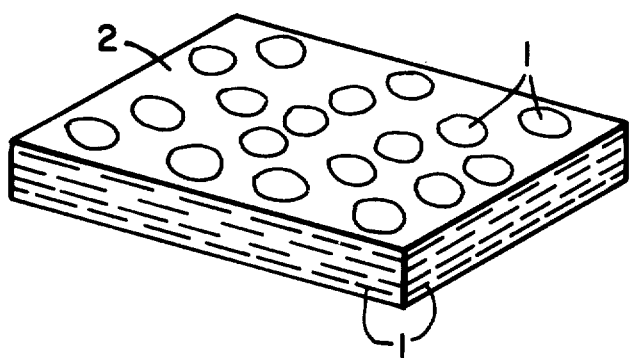
FIG. 1 is a schematic representation of a section of a fluorophlogopite mica glass-ceramic article wherein the fluorophlogopite platelets 1 exhibit orientations characterized by preferential alignment of mica layers in directions paralleling a common plane, such as the plane defined by surface 2 of the illustrated section.
Figure 2:
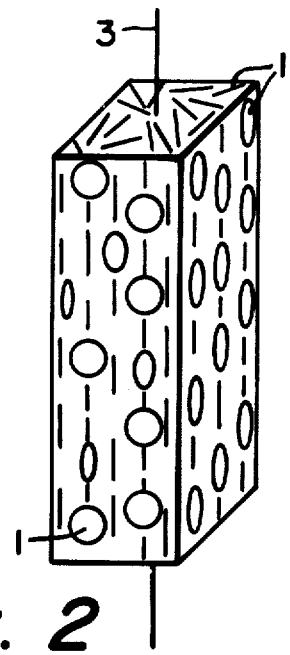
FIG. 2 is a schematic representation of a section of a fluorophlogopite mica glass-ceramic article wherein the fluorophlogopite platelets 1 exhibit orientations characterized by preferential alignment of mica layers in directions paralleling a common axis, such as axis 3 of the illustrated section.
Figure 3:
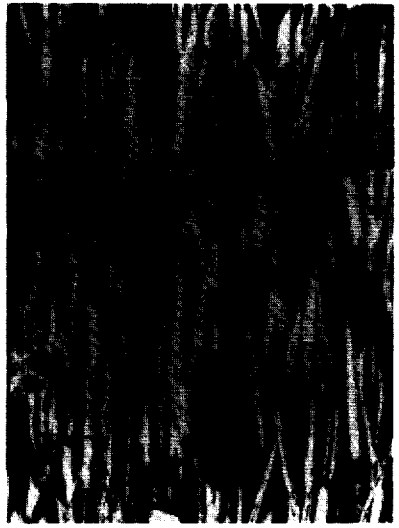
Figure 4:
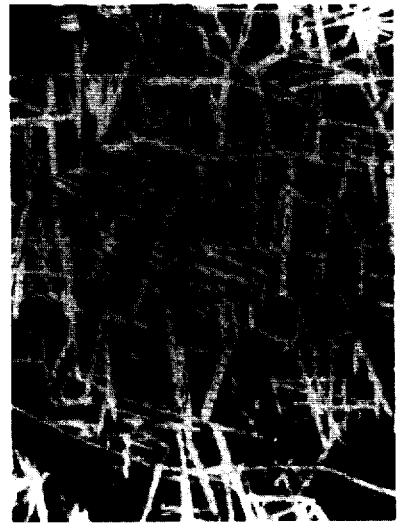

FIG. 3 is an optical photomicrograph of a section of a redrawn and crystallized fluorophlogopite-containing glass-ceramic material, taken parallel to the draw direction, showing the alignment of mica crystals parallel to the draw axis of the material; and FIG. 4 is an optical photomicrograph of a section of the glass-ceramic material of FIG. 3, taken perpendicular to the draw direction of the material, showing randomness of orientation about the draw axis but no crystals lying perpendicular thereto.

Whereas crystal alignment by orientation of nuclei is limited to fluorophlogopite glass-ceramics, crystal orientation may also be obtained in fluorophlogopite solid solution, alkaline earth metal fluormica, tetrasilicic fluormica, and fluor-amphibole glass-ceramics by deformation of the parent glass during the crystallization process itself, so as to obtain alignment of the forming crystals. In general, crystal alignment by this method will involve high-stress compressive deformation of the crystallizing glass article by pressing or rolling at temperatures in the crystallization range of the glass.

DETAILED DESCRIPTION

Glass-ceramic articles comprising oriented fluorophlogopite mica solid solution crystals can be produced from any of the compositions utilized for the production of such articles in the prior art. Such compositions typically comprise in weight percent on the oxide basis, about 25–60% $SiO_2$, 15–35% $R_2O_3$, wherein $R_2O_3$ consists of 3–15% $B_2O_3$ and 5–25% $Al_2O_3$, 2–20% $R_2O$, wherein $R_2O$ consists of 0–15% $Na_2O$, 0–15% $K_2O$, 0–15% $Rb_2O$ and 0–20% $Cs_2O$, 4–25% MgO, 0–7% $Li_2O$, 6–25% total of MgO+$Li_2O$, and 4–20% F, these constituents making up at least about 90% by weight of the composition. Minor additions of other oxides to the base compositions, such as $P_2O_5$, $TiO_2$, $ZrO_2$, BaO, SnO, CaO, FeO, ZnO, CdO, $GeO_2$, $SnO_2$ and PbO, can be tolerated in amounts totalling not more than about 10% by weight.

Glasses within the above composition range are provided by melting batches of appropriate composition in pots, tanks, or crucibles at temperatures in the range of about 1300°–1500°C., in accordance with conventional practice. Batch ingredients for these glass may comprise any constituents, whether oxides or other compounds, which are converted to the required oxide components at the temperatures utilized for melting the batch. Following melting, the molten glass is simultaneously cooled below the transformation range thereof and formed into a glass article by casting, pressing, spinning or other conventional forming techniques.

The preferred method of obtaining crystal orientation in fluorophlogopite glass-ceramics is by the process of producing orientation of crystal nuclei present in the glass. In accordance with this method, after a glass article of the specified composition is prepared, it must be heated to a temperature and for a time sufficient to initiate and promote the growth of crystal nuclei therein, and also maintained at some elevated temperature at which the viscosity of the glass will permit plastic deformation of the article, so that deformation may be achieved. A two-phase procedure comprising heating the glass article to a temperature in the nucleation range thereof and maintaining it in that range for a time sufficient to initiate and promote the growth of crystal nuclei in the glass, followed by adjustment of the glass temperature to achieve a glass viscosity in the range of about $10^{7.5} - 10^{10}$ poises and deformation of the glass article, may be utilized for this purpose. However, the nucleation range for these compositions (about 750°–850°C.) overlaps the $10^{7.5} - 10^{10}$ poise viscosity temperature range (extending down to about 800°C.), and nucleation is rapid at the upper end of the nucleation range. Therefore, in many cases no hold as such in the nucleation range is required and the glass may simply be heated to a temperature in the $10^{7.5} - 10^{10}$ viscosity range and subjected to deformation to align the crystal nuclei which form therein during the heating and deformation processes.

Recent research has indicated that the nucleation process in compositions thermally crystallizable to fluorophlogopite solid solutions involves several stages unique to these glass-ceramic materials. Phase separation in the as-formed glass article is followed sequentially by the formation of a disordered chondrodite, then norbergite, and finally fluorophlogopite. The norbergite phase occurs in elongated form and may be the phase which is aligned during glass deformation. In any event, X-ray examination of the nucleated, reformed glass prior to final crystallization shows no appreciable fluorophlogopite formation, suggesting that alignment of at least one of the nucleating species is responsible for the crystal orientation observed in the subsequently-developed fluorophlogopite phase.

Crystallization of the nucleated reformed glass article is achieved by heat treatments conventionally utilized in the prior art to produce fluorophlogopite mica glass-ceramics, comprising heating to a temperature in the crystallization range for a time sufficient to achieve the formation of a fluorophlogopite mica phase comprising at least about 50% by volume of the article. Suitable treatments comprise heating at temperature in the range of about 850°–1100°C. for times in the range of about 1–8 hours.

Examples of compositions for fluorophlogopite mica-containing glass-ceramics which exhibit the above-described nucleation sequence and are thus treatable in accordance with the preferred method of the invention are set forth in Table I below. Compositions are set forth in parts by weight as calculated from the batch. Since fluorine is not associated with any specific cation, the fluorine contents are reported on an elemental basis and the fluorine-oxygen correction factor (—O) is tabulated in accordance with conventional glass analysis practice.

TABLE I

|  | 1 | 2 | 3 | 4 |
|---|---|---|---|---|
| $SiO_2$ | 42.4 | 47.2 | 36.0 | 41.1 |
| $B_2O_3$ | 11.6 | 8.5 | 15.0 | 11.2 |
| $Al_2O_3$ | 16.9 | 16.7 | 17.4 | 17.5 |
| MgO | 19.5 | 14.5 | 21.0 | 21.5 |
| $K_2O$ | 4.7 | 9.5 | 6.8 | 4.7 |
| F | 8.5 | 6.3 | 6.5 | 7.0 |
| —O | −3.6 | −2.7 | −2.7 | −3.0 |

Methods of producing fluorophlogopite-containing glass-ceramic articles comprising oriented crystals are shown in more detail in the following examples.

EXAMPLE I

A batch for a glass having a composition consisting essentially, in weight percent on the oxide basis, of about 47.2% $SiO_2$, 8.5% $B_2O_3$, 16.7% $Al_2O_3$, 14.5% MgO, 9.5% $K_2O$ and 6.3% F, (fluorine correction −2.-7%O) is compounded and melted in a covered crucible at 1450°C. for 4 hours. The melt is then cast into a glass rod about 1 inch in diameter. The glass is then annealed at 650°C.

The annealed rod is then heated to a temperature of about 845°C. at a rate of about 500°C. per hour. Nucleation of the glass commences at about 750°C. and continues for the period during which the glass is above this temperature. The viscosity of the glass at the peak temperature of 845°C. is about $10^9$ poises.

The softened nucleating glass is then drawn into a glass rod several feet in length, having a diameter ranging from 0.1 to 0.4 inches, and cooled.

Finally the glass rod is thermally crystallized by heat-treating at 1000°C. for 4 hours and cooled to room temperature. Examination of this rod utilizing the electron microscope and X-ray diffraction techniques shows that the glass-ceramic material making up the rod is highly crystalline and composed predominately of fluorophlogopite solid solution crystals about 5–10 microns in size, characterized by a simple stacking pattern (1 M). However, X-ray diffractometer tracings obtained from observations made parallel to the rod axis (draw direction) show strongly accentuated X-ray peaks attributable to reflections from basal planes such as (001), (003) and (005). On the other hand, tracings from observations taken perpendicular to the rod axis do not show basal reflections but instead show accentuated reflections from planes perpendicular to basal planes such as (020), (200) and (060). These observations confirm that a high degree of crystal orientation, characterized by preferential mica layer alignment in a direction parallel to the rod elongation axis, has been achieved in the glass-ceramic article.

EXAMPLE II

A glass rod of the composition set forth in Example I, prepared as therein described, is redrawn by heating to a temperature of 845°C. at a rate of 500°C. per hour, and drawing the softened nucleating glass rod to form a nucleated glass rod about 0.12 inches in diameter. This rod is then subjected to a crystallizing heat treatment comprising heating at a rate of 100°C. per hour to 950°C. and maintaining at that temperature for 2 hours, followed by cooling to room temperature.

Sections of this redrawn glass-ceramic rod, comprising mica crystals preferentially oriented parallel to the rod axis, are then subjected to modulus of rupture testing along with control rods comprising nonoriented crystals. These control rods are rods the same composition and configuration which are crystallized by the same heat treatment but not redrawn prior to crystallization. This control set of rods shows an average modulus of rupture strength of 17,300 psi with a standard deviation of 4.7%, whereas the redrawn rods comprising aligned crystals show an average modulus of rupture strength of 35,900 psi with a standard deviation of 7.5%. This doubling of the strength is attributed to crystal alignment in the redrawn rods.

EXAMPLE III

A batch for a glass consisting essentially, in weight percent on the oxide basis, of about 42.4% $SiO_2$, 11.6% $B_2O_3$, 16.9% $Al_2O_3$, 19.5% MgO, 4.7% $K_2O$, and 8.5% F (fluorine correction −3.6%0), is melted at 1450°C. for 4 hours and then cast into a glass rod about 2 inches in diameter.

This glass rod is then heated to a temperature of about 865°C. at a rate of about 500°C. per hour and drawn into a smaller rod.

The nucleated glass rod so produced is then subjected to a crystallizing heat treatment comprising heating at 800°C. for 4 hours and subsequently heating at 1050°C. for 4 hours. This heat treatment is effective to produce coarse fluorophlogopite crystals of about 0.5 mm diameter in the semicrystalline material.

Thin sections taken parallel and perpendicular to the draw direction are then prepared from this material and examined with the optical microscope. FIG. 3 of the drawing is an optical photomicrograph of a glass-ceramic section taken parallel to the direction in which the nucleating glass was drawn, and shows the very high degree of alignment of mica crystals parallel to the draw direction. FIG. 4 is an optical photomicrograph of a glass-ceramic section taken perpendicular to the direction in which the nucleating glass was drawn, and shows the so-called fiber texture characterized by random orientation of mica crystals about the draw axis but no crystals lying perpendicular thereto. Again, a high degree of crystal alignment parallel to the draw axis is indicated.

Because this method of the invention depends on the alignment of crystal nuclei in these materials, a high degree of fluorophlogopite crystal alignment is obtained even in glass-ceramic materials comprising relatively small (5 micron) crystals, as evidenced by X-ray diffraction examination of these materials described in Example I.

Whereas only the fluorophlogopite solid solution compositions have been found to be amenable to crystal orientation by the preferred method of aligning crystal nuclei as above described, it is possible to obtain non-random crystal orientation in fluorophlogopite and other systems by deformation of the material during the process of crystallization. However, crystal orientation achieved by the alignment of developing crystals in the glass, as opposed to the alignment of crystal nuclei, will require higher temperatures and higher deformation stresses because the development of crystal phases in the glass rapidly increases glass viscosity in these systems.

In general, any of the above-described fluormica and fluoramphibole glass-ceramics having principal crystal phases consisting of anisometric crystals are amenable to treatment during the crystallization process in accordance with the invention to obtain crystal orientation therein. These include the fluorophlogopite micas, the alkaline earth metal fluormicas, the tetrasilicic fluormicas and the fluoramphiboles.

Glass articles which are thermally crystallizable to yield principal crystal phases selected from the above group are prepared in accordance with conventional practice by melting a batch for a glass of appropriate composition and cooling the molten glass to a temperature at least below the transformation range thereof while simultaneously shaping a glass article therefrom.

Glass articles thermally crystallizable to yield fluorophlogopite mica solid solution as the principal crystal phase may be prepared from any of the compositions hereinabove specified as suitable for this purpose.

Compositions consisting essentially, in weight percent, of about 30–65% $SiO_2$, 5–26% $Al_2O_3$, 10–35% MgO, 3–30% RO, wherein RO consists of 3–30% SrO and 0–25% BaO, and 3–15% F can be melted and formed into glass articles which are thermally-crystallizable to yield glass-ceramics wherein alkaline earth metal fluormicas comprise the principal crystal phase.

Glass-ceramics wherein tetrasilicic fluormica comprises the principal phase can be produced from glass articles having a composition consisting essentially, in weight percent on the oxide basis, of about 45–70% $SiO_2$, 8–20% Mgo, 5–25% $R_2O$, wherein $R_2O$ consists of one or more oxides selected in the indicated proportion from the group consisting of 0–20% $K_2O$, 0–23% $Rb_2O$ and 0–25% $Cs_2O$, 0–20% RO, wherein RO is an oxide selected from the group consisting of SrO, BaO and CdO, 5–35% total of the aforesaid $R_2O$ and RO, 0–10% total of oxides selected from the group consisting of $As_2O_5$ and $Sb_2O_5$, and 8–15% $MgF_2$.

And finally, compositions consisting essentially, in weight percent on the oxide basis, of about 48–75% $SiO_2$, 5–27% MgO, 4–13% $MgF_2$, 0–15% $Al_2O_3$, 0–10% $B_2O_3$, and 3–20% $R_2O$, wherein $R_2O$ is selected in the indicated proportion from the group consisting of 4–16% $Na_2O$ and 3–10% $Li_2O$, can be formed into glass articles which are thermally-crystallizable to yield fluoramphibole crystals as the principal crystal phase.

The preferred method of achieving crystal orientation by crystal alignment in these glass-ceramic systems comprises melting a batch for a glass having a composition selected from one of the groups above described; cooling the melt below the transformation range thereof while simultaneously shaping a glass article therefrom; heating the glass article to a temperature in the crystallization range thereof for a time at least sufficient to initiate the growth of fluormica or fluoramphibole crystals therein; adjusting the temperature of the crystallizing article to achieve a glass viscosity in the range of about $10^{7.5} - 10^{10}$ poises, thus rendering the article plastically deformable; deforming the article to align the developing crystals therein, and finally further heating the article, if desired, at a temperature in the crystallization range thereof to complete the development of the principal crystal phase.

The crystallization ranges of the fluormica and fluoramphibole glass-ceramics are known. Glass compositions which are thermally-crystallizable to yield fluorphlogopite solid solution as the principal crystal phase are crystallized in the 750–1100°C. range, while compositions crystallizable to alkaline earth fluormica are crystallized in the 800°–1200°C. range. Compositions thermally-crystallizable to yield tetrasilicic fluormica as the principal phase are crystallized by heating at temperatures in the 750°–1150°C. range, while glass-ceramics of the fluoramphibole type having compositions in the above-described region are produced by heating in the 750°–1000°C. range.

As is also known, the viscosity of glasses undergoing thermal crystallization to the glass-ceramic state increases rapidly as the volume fraction of crystals in the glass increases. It is desirable to accomplish deformation of the glass prior to full development of crystal phases therein so that deformation viscosities in the specified range ($10^{7.5}-10^{10}$ poises) can be achieved in a moderate temperature range (750°–900°C.). However, deformation of fully-crystallized articles may be accomplished by heating at temperatures above the solidus temperature of the article for a time sufficient to achieve deformation viscosities.

Because higher stresses are required to deform glass-ceramic materials during the crystallizing process, methods of compressive deformation which are not limited by the strength of the glass being deformed are preferred. Examples of such methods include pressing the glass or passing the glass between rollers. The following example illustrates a method of orienting crystals in a tetrasilic fluormica glass-ceramic article by compressive deformation during the crystallization process.

Example IV

A batch for a glass having a composition consisting essentially in weight percent on the oxide basis, of about 60.6% $SiO_2$, 20.3% MgO, 13.5% $K_2O$, 2.0% $As_2O_5$ and 6.3% F (fluorine correction −2.7%O) is compounded and melted in a covered crucible at 1450°C. for 4 hours. The melt is then cast into a 3 × 4 inch glass plate about 1 inch thick. The glass plate is then annealed at 600°C.

The annealed plate is then placed in a furnace and covered with refractory blocks providing a downward pressure of about 15 psi. The glass is heated to a temperature of 1110°C. at a rate of about 200°C. per hour. Nucleation of the glass commences at about 650°C. and large scale crystal growth of tetrasilicic fluormica crystals begins at about 950°C. Further heating to 1110°C. and holding there for 4 hours enhances the grain growth. The force applied to the glass plate results in its deformation to a thickness of approximately one-eighth inch.

Examination of the reformed glass plate by electron microscopy and by X-ray diffraction reveals a glass-ceramic which is highly crystalline and composed of tetrasilicic mica crystals about 8 to 15 microns in size. X-ray diffractometer tracings obtained from observations made parallel to the pressed surface show strongly accentuated X-ray peaks attributable to the basal spacings such as (001), (002), (003), and (005). X-ray diffractometer tracings obtained from observations made perpendicular to the pressed surface reveal only those peaks attributable to crystal spacings which lie perpendicular to the basal planes, such as (200) and (060). These results indicate that a high degree of orientation of the large dimensions of the mica platelets in directions parallel to the pressed surface of the plate has been obtained.

From the above description and examples it will be recognized that numerous variations and modifications of the procedures hereinabove described may be carried out in order to secure the advantages of the present invention. Thus, crystal orientation may be limited to certain sections of a glass-ceramic article by selective deformation, or different orientations in different sections may be obtained. Nevertheless, glass ceramic articles comprising in at least a portion thereof an oriented principal crystal phase exhibiting preferential alignment of the largest crystal dimensions in directions parallel to a common axis or plane exhibit modified and improved properties for use in a variety of applications.

I claim:

1. A glass-ceramic article comprising in at least a portion thereof an oriented principal crystal phase consisting of crystals selected from the group consisting of fluorphlogopite solid solution, alkaline earth metal fluormica, tetrasilicic fluormica and fluoramphibole crystals dispersed in a glassy matrix, said glass-ceramic article having a composition a. consisting essentially, in weight percent, of about 26–60% $SiO_2$, 15–35% $R_2O_3$, wherein $R_2O_3$ consists of 5–15% $B_2O_3$ and 5–25% $Al_2O_3$, 2–20% $R_2O$, wherein $R_2O$ consists of 0–15% $K_2O$, 0–15% $Rb_2O$ and 0–20% $Cs_2O$, 4–25% MgO, 0–7% $Li_2O$, 6–25% MgO + $Li_2O$, and 4–20% F when the oriented principal crystal phase consists of fluorphlogopite solid solution crystals;

b. consisting essentially, in weight percent, of about 30–65% $SiO_2$, 5–26% $Al_2O_3$, 10–35% MgO, 3–30% RO wherein RO consists of 3–30% SrO and 0–25% BaO, and 3–15% F when the oriented principal crystal phase consists of alkaline earth metal fluormica crystals;

c. consisting essentially, in weight percent, of about 45–70% $SiO_2$, 8–20% MgO, 5–25% $R_2O$, wherein $R_2O$ consists of 0–20% $K_2O$, 0–23% $Rb_2O$ and 0–25% $Cs_2O$, 0–20% RO, wherein RO is selected from the group consisting of SrO, BaO and CdO, 5–35% total of $R_2O$ + RO, 0–10% of oxides selected from the group consisting of $As_2O_5$ and $Sb_2O_5$, and 8–15% $MgF_2$ when the oriented principal crystal phase consists of tetrasilicic fluormica crystals; and d. consisting essentially, in weight percent, of about 48–75% $SiO_2$, 5–27% MgO, 4–13% $MgF_2$, 0–15% $Al_2O_3$, 0–10% $B_2O_3$, and 3–20% $R_2O$, wherein $R_2O$ is selected in the indicated proportion from the group consisting of 4–16% $Na_2O$ and 3–10% $Li_2O$, when the oriented principal crystal phase consists of fluoramphibole crystals;

said oriented crystal phase being characterized by preferential alignment of the largest dimensions of the selected crystals in directions parallel to a common axis or plane.

2. A glass-ceramic article in accordance with claim 1 wherein the selected crystals are fluorophlogopite solid solution, and wherein the fluorophlogopite solid solution crystals have a grain size greater than about 5 microns, an aspect of at least about 5:1, and comprise about 50–90% by volume of the article.

3. A method of making a glass-ceramic article consisting essentially of fluorophologopite mica solid solution crystals dispersed in a glassy matrix, wherein said crystals exhibit non-random orientation such that mica layers of the crystals in at least a portion of the article show preferential alignment in directions parallel to a common axis or plane, which comprises the steps of a. melting a batch for a glass consisting essentially in weight percent on the oxide basis, of about 25–60% $SiO_2$, 15–35% $R_2O_3$, wherein $R_2O_3$ consists of 5–15% $B_2O_3$ and 5–25% $Al_2O_3$, 2–20% $R_2O$, wherein $R_2O$ consists of 0–15% $K_2O$, 0–15% $Na_2O$, 0–15% $Rb_2O$, and 0–20% $Cs_2O$, 4–25% MgO, 0–7% $Li_2O$, 6–25% total of MgO + $Li_2O$, and 4–20% F;

b. simultaneously cooling the melt at least below the transformation range thereof and shaping a glass article therefrom;

c. heating the article to a temperature at least sufficient to cause the growth of crystal nuclei therein;

d. adjusting the temperature of the article to achieve a glass viscosity in the range of about $10^{7.5} - 10^{10}$ poises, to render the article plastically deformable;

e. deforming the article to align the crystal nuclei therein; and f. heating the article to a temperature in the crystallization range of the glass for a time sufficient to achieve the formation of a fluorophlogopite solid solution crystal phase comprising at least about 50% by volume of the article.

4. A method for producing a glass-ceramic article comprising in at least a portion thereof an oriented crystal phase consisting of crystals selected from the group consisting of fluorphlogopite solid solution, alkaline earth metal fluormica, tetrasilicic fluormica, and fluoramphibole crystals dispersed in a glassy matrix which comprises the steps of:

a. melting a batch for a glass having a composition selected from the group of i. compositions consisting essentially, in weight percent, of about 26–60% $SiO_2$, 15–35% $R_2O_3$, wherein $R_2O_3$ consists of 5–15% $B_2O_3$ and 5–25% $Al_2O_3$, 2–20% $R_2O$, wherein $R_2O$ consists of 0–15% $K_2O$, 0–15% $Na_2O$, 0–15% $Rb_2O$ and 0–20% $Cs_2O$, 4–25% MgO, 0–7% $Li_2O$, 6–25% MgO + $Li_2O$, and 4–20% F which are thermally-crystallizable to yield fluorophlogopite solid solution as the principal crystal phase;

ii. compositions consisting essentially, in weight percent, of about 30–65% $SiO_2$, 5–26% $Al_2O_3$, 10–35% MgO, 3–30% RO, wherein RO consists of 3–30% SrO and 0–25% BaO, and 3–15% F which are thermally-crystallizable to yield alkaline earth metal fluormica crystals as the principal crystal phase;

iii. compositions consisting essentially, in weight percent, of about 45–70% $SiO_2$, 8–20% MgO, 5–25% $R_2O$, wherein $R_2O$ consists of 0–20% $K_2O$, 0–23% $Rb_2O$, and 0–25% $Cs_2O$, 0–20% RO, wherein RO is selected from the group consisting of SrO, BaO, and CdO, 5–35% total of $R_2O$ + RO, 0–10% total of oxides selected from the group consisting of $As_2O_5$ and $Sb_2O_5$, and 8–15% $MgF_2$ which are thermally-crystallizable to yield tetrasilicic fluormica crystals as the principal crystal phase; and iv. compositions consisting essentially, in weight percent, of about 48–75% $SiO_2$, 5–27% MgO, 4–13% $MgF_2$, 0–15% $Al_2O_3$, 0–10% $B_2O_3$, and 3–20% $R_2O$, wherein $R_2O$ is selected in the indicated proportions from the group consisting of 4–16% $Na_2O$ and 3–10% $Li_2O$, which are thermally-crystallizable to yield fluoramphibole crystals as the principal crystal phase;

b. cooling the molten glass to a temperature at least below the transformation range thereof while simultaneously forming a glass article therefrom;

c. heating the glass article to a temperature in the crystallization range thereof for a time at least sufficient to initiate the growth of said crystals therein;

d. adjusting the temperature of the glass article to achieve a glass viscosity in the range of about $10^{7.5}-10^{10}$ poises to render the article plastically deformable;

e. deforming the glass article to align the crystals present therein; and f. further heating the glass article at a temperature in the crystallization range for a time sufficient to complete the development of a principal crystal phase therein comprising at least about 50% by volume of the article.

* * * * *